(12) United States Patent
Moram et al.

(10) Patent No.: US 9,517,613 B2
(45) Date of Patent: Dec. 13, 2016

(54) METHOD OF FORMING A COMPOSITE STRUCTURE COMPRISING A FLANGE

(75) Inventors: Jonathan Paul Moram, East Cowes (GB); Giovanni Antonio Marengo, East Cowes (GB); David James Maclean, East Cowes (GB); Ben Ralfs, East Cowes (GB); Gary Wiles, East Cowes (GB); Marcus Jason Gawn, East Cowes (GB)

(73) Assignee: GKN Aerospace Services Limited, East Cowes, Isle of Wight (GB)

( * ) Notice: Subject to any disclaimer, the term of this patent is extended or adjusted under 35 U.S.C. 154(b) by 683 days.

(21) Appl. No.: 13/991,575

(22) PCT Filed: Dec. 6, 2011

(86) PCT No.: PCT/GB2011/052412
§ 371 (c)(1),
(2), (4) Date: Jun. 4, 2013

(87) PCT Pub. No.: WO2012/076875
PCT Pub. Date: Jun. 14, 2012

(65) Prior Publication Data
US 2013/0266431 A1    Oct. 10, 2013

(30) Foreign Application Priority Data
Dec. 7, 2010  (GB) .................................. 1020742.1

(51) Int. Cl.
*B32B 37/02* (2006.01)
*B29C 53/04* (2006.01)
(Continued)

(52) U.S. Cl.
CPC ............... *B32B 37/02* (2013.01); *B29C 53/04* (2013.01); *B29C 70/342* (2013.01);
(Continued)

(58) Field of Classification Search
None
See application file for complete search history.

(56) References Cited

U.S. PATENT DOCUMENTS

| 4,777,005 A | 10/1988 | Miller |
| 5,468,331 A | 11/1995 | Makarenko et al. |

(Continued)

FOREIGN PATENT DOCUMENTS

| DE | 28 23 669 A1 | 1/1979 |
| DE | 10 2008 057783 B3 | 2/2010 |

(Continued)

OTHER PUBLICATIONS

Office Action from Japanese Patent Office for Application No. 2013-542605 mailed Oct. 27, 2015 (7 pages, with translation).

(Continued)

*Primary Examiner* — Igor Kershteyn
*Assistant Examiner* — Justin Seabe
(74) *Attorney, Agent, or Firm* — Bejin Bieneman PLC

(57) ABSTRACT

Method forming a composite structure (9) comprising a main body and a flange. The composite structure is manufactured by laying-up a preform (7) on a mold (6). The preform (7) does not have the first and second bends and comprises a first part which corresponds to the main body of the composite structure and a second part which corresponds to the flange of the composite structure. The second part of the (preform (7) has a proximal portion which corresponds to the wall portion of the flange and a distal portion which corresponds to the lip portion of the flange. The preform (7) comprises a plurality of plies and uni-directional ply material extends from the first part of the preform (7) to the distal portion of the second part of the preform (7). The flange is formed by advancing movable portion(s) (62) of the mold 6 to form the proximal portion of the second part of the (Continued)

preform (7) to create the first bend (81) and by forming the distal portion of the second part of the preform (7) around the advancing movable portion(s) (62) of the mold (6) to create the second bend (83). The presence of the two bends (81, 83) ensures that the ply material (78) is kept in tension during the forming operation.

11 Claims, 8 Drawing Sheets

(51) Int. Cl.
  *B29C 70/34* (2006.01)
  *F01D 21/04* (2006.01)
  *F01D 25/24* (2006.01)
  *B29C 57/00* (2006.01)
  *B29K 105/08* (2006.01)
  *B29L 9/00* (2006.01)
  *B29L 31/30* (2006.01)

(52) U.S. Cl.
  CPC .......... *B29C 70/345* (2013.01); *F01D 21/045* (2013.01); *F01D 25/24* (2013.01); *B29C 57/00* (2013.01); *B29K 2105/0881* (2013.01); *B29L 2009/00* (2013.01); *B29L 2031/30* (2013.01); *F05D 2300/603* (2013.01); *Y02T 50/672* (2013.01); *Y10T 156/1044* (2015.01); *Y10T 428/24628* (2015.01)

(56) References Cited

U.S. PATENT DOCUMENTS

| | | | |
|---|---|---|---|
| 5,639,535 A * | 6/1997 | McCarville | B29C 70/30 156/182 |
| 7,141,199 B2 * | 11/2006 | Sana | B29C 70/345 264/255 |
| 7,335,012 B2 * | 2/2008 | Blanton | B29C 33/48 156/245 |
| 2007/0086854 A1 | 4/2007 | Blanton | |
| 2008/0115555 A1 | 5/2008 | Depase et al. | |
| 2009/0098337 A1 * | 4/2009 | Xie | B29C 70/222 428/121 |

FOREIGN PATENT DOCUMENTS

| | | |
|---|---|---|
| EP | 1 393 875 A1 | 3/2004 |
| EP | 1 481 790 A3 | 12/2004 |
| FR | 2 879 497 A1 | 6/2006 |
| WO | 2009027684 A1 | 3/2009 |

OTHER PUBLICATIONS

International Search Report and Written Opinion under date of mailing of May 3, 2012 in connection with PCT/GB2011/052412.
Search Report dated Nov. 28, 2011 in connection with GB1020742.1.
Examination Report issued by EPO for EP 11 796 792.7-1703 mailed on May 3, 2016 (6 pages).

* cited by examiner

METHOD OF FORMING A COMPOSITE STRUCTURE COMPRISING A FLANGE

CROSS-REFERENCE TO RELATED APPLICATIONS

This application represents the national stage entry of PCT International Application No. PCT/GB2011/052412 filed Dec. 6, 2011 and claims the benefit of Great Britain Application No. 1020742.1 filed Dec. 7, 2010. The contents of both of these applications are hereby incorporated by reference as if set forth in their entirety herein.

FIELD OF THE INVENTION

The present invention relates to a composite structure such as a containment case for a gas turbine engine, although the present invention is broadly applicable to composite structures such as, in the aerospace industry, a wing spar or any component that needs to include an integral flange such as a straight flange or a curved flange such as an annular flange.

BACKGROUND

Characteristics of composite materials have meant that composite components are employed in an increasing range of applications from aerospace to automotive parts.

In the aerospace industry, for example, composite materials have been used for a number of years owing to their strength to weight ratio. The term "composite materials" (known also as "composites") is used to describe materials comprising for example glass fibre or carbon fibres and an epoxy resin (or similar). These are also known as glass reinforced plastic or carbon fibre reinforced composites. The carbon fibre reinforced composite material offers improved properties such as lower weight, improved fatigue/damage resistance, corrosion resistance and negligible thermal expansion.

The use of these materials has increased throughout the aerospace industry predominantly because of the fuel savings which can be achieved over the life of an aircraft by reducing the overall sum weight of the components making up the aircraft. Aerodynamic as well as structural components are formed of composite materials and particularly carbon fibre materials.

A composite component may be laid-up using a cloth, tape or the like pre-impregnated with resin to form a stack corresponding to the desired shape of the part to be formed. The stack is then cured either at ambient temperature and pressure or at elevated temperature and pressure in an autoclave to create a hardened component.

A gas turbine engine such as a turbofan may be provided with a containment case for preventing a broken blade of the engine from exiting the engine and damaging the rest of the aircraft. For example, a containment case may be provided around the fan at the front of the turbofan engine. The containment case may be made of composite material such as carbon fibre reinforced composite material and/or Kevlar reinforced composite material. The containment case is in the shape of a generally cylindrical barrel or housing. The containment case needs to be attached to adjacent structural components of the engine and it is therefore desirable for the containment case to include a flange at one or both of the ends of the barrel or housing.

FIG. 1 is a diagrammatic side view of a typical known turbofan engine 1 having a fan case 11 defining a fan duct 12 which contains a rotating disc of fan blades 13. The fan blades 13 rotate around a central longitudinal axis 14 of the engine 1.

The fan case 11 is annular and is centred on the longitudinal axis 14. The fan case 11 is shown partly cut away in FIG. 1 in order to diagrammatically illustrate the fact that the fan case 11 includes an annular containment case 2 positioned around the periphery of the disc of fan blades 13 in order to contain any broken fan blade 13. The containment case 2 comprises a generally-cylindrical barrel or housing 3 at the front end of which is an outwardly-extending annular flange 41 and at the rear end of which is an outwardly-extending annular flange 42.

The containment case 2 is centred on the longitudinal axis 14 of the engine 1 and is held in position by being fastened to other components of the fan case 11 such as an annular front leading edge 51 and an annular rear edge 52. The flanges 41 and 42 may be provided with holes for fasteners which are used to attach the containment case 2 to the structure of the leading and rear edges 51, 52.

FIG. 2 is a diagrammatic perspective view of a containment case 2 generally similar to the one shown in FIG. 1 except that in FIG. 2 the generally-cylindrical housing 3 is slightly tapered in the direction of the longitudinal axis 14. The actual internal contour or profile of the housing 3 may be optimised to suit the requirements of a particular engine 1.

It is convenient to use a machine, such as an automated tape laying (ATL) machine, to lay-up the plies of composite material of the housing of the containment case on a mould or mandrel. It has proved difficult to use a machine to lay-up the plies of the composite material of the flange and to integrate the composite material of the flange with the composite material of the housing, before the housing and the flange are cured. It has proved necessary to manually lay-up the plies of the flange, ply by ply, against an outwardly-projecting annular wall of the mould which extends outward from the main cylindrical mould surface on which the plies of the housing have been machine-laid up. The plies of the flange are hand laid and must be intermeshed with the machine-laid plies of the housing. This tends to produce a flange of inconsistent quality and, in order to compensate for this, a flange which is heavier than it needs to be because it is using an excess of composite material.

At GKN Aerospace, we have recently been experimenting with a configuration during the laying-up of the composite material which facilitates machine laying of the flange in addition to machine laying of the curved main surface of a composite structure. In this way, all of the laying-up of the composite material may be automated, and it is no longer necessary to use manual or hand laying. Automating the laying-up of the flange produces an improvement in the quality of the flange and the composite structure.

Our experimental tool for forming (bending) a second part 43 to form a flange 4 (corresponding, for example, to part of the front flange 41) is shown in FIGS. 3 to 6. The experimental tool incorporates a first part 61 of a cylindrical mould or mandrel 6 and a circumferential line of movable blocks 62. An experimental part 21 of the containment case 2 is laid-up as a preform on a mould surface 611 of the first mould part 61 and on mould surfaces 621 of the movable blocks 62. The preform comprises the second part 43 and a first or main part 31. The second part 43 is laid-up on the mould surfaces 621 and the first part 31 is laid-up on the mould surface 611.

Pre-impregnated uni-directional tape making up the composite material of the experimental part 21 is laid-up obliquely (e.g. at plus 60° and at minus 60° relative to the circumferential direction) in both the first part 31 and the second part 43. In the context of the experimental part 21, the circumferential direction corresponds to the boundary line 211 between the parts 31, 43. Circumferential tape (0° tape) is laid-up in the first part 31 but not in the second part 43. Perpendicular tape (90° tape) is laid up in the second part 43 and extends a short distance into the first part 31.

For example, the tape is 0.25 mm thick and has a typical width of 75 mm to 150 mm. Such tape is suited to being laid-up by the head of an ATL machine. The tape is laid-up to form a stack of plies, and the number of ply layers may be 10 or more, preferably 20 or more, or preferably 30 or more.

The laid-up tape of the experimental part 21 is cut back so that the circumferential free edge 431 of the second part 43 does not project beyond movable blocks 62 of the mould 6.

A female forming tool 63 (see FIG. 4) is then clamped down onto the part of the first part 31 immediately adjacent the second part 43.

The mould 6 is then placed in an oven and heated to a first temperature, e.g. 80° C., at which the resin of the pre-preg tape becomes fluid enough (has a low enough viscosity) to facilitate the forming operation which is about to occur. At this point, the blocks 62 are advanced in a radially outward direction from their retracted or flush position to the advanced position shown in FIGS. 5 and 6 by actuating actuators 64 such as pneumatic or hydraulic pistons. This forms or flexes upwards the second part 43 to form the flange 4 projecting outwards relative to the first part 31. The blocks 62 are advanced by a distance which is at least the width 432 of the second part 43 so that the flange 4 that is formed is an upright wall relative to the first part 31.

The temperature in the oven is then raised to a second, higher temperature in order to continue and complete the curing of the composite tape material. For example, the second temperature may be 135° C. After the curing cycle or process has been completed, the blocks 62 may be retracted to the position shown in FIGS. 3 and 4. The female tool 63 may be removed, and the experimental part 21 removed from the mould 6.

FIGS. 7 and 8 are diagrammatic cross-sectional views through the flange wall 4 (the second part 43) and the adjacent part of the first part 31 after the forming operation has been performed, and FIG. 7 shows the outcome of a correct forming operation and FIG. 8 shows the outcome of an incorrect forming operation.

If the forming operation is correctly performed as shown in FIG. 7, the plies 44a-44g slide over one another in the second part 43 and the thickness of the second part 43 is not distorted. However, a so-called "bookend" effect 433 is produced at the free edge 431 of the second part 43, whereby the free edge 431 is slanted.

The flange 4 may be trimmed to a desired height along a cut line 434 and this will remove the unwanted bookend effect 433.

In FIGS. 7 and 8, only 7 plies 44a-44g are shown for reasons of clarity, but in practice it is usually the case that a larger number of ply layers will be present.

During the forming operation, the bending upwards of the second part 43 will tend to place the plies at the inside of the bend (such as plies 44a and 44b) in compression and will tend to place the plies at the outside of the bend (such as plies 44f and 44g) in tension.

If the forming operation is performed too quickly, such that the plies are unable to move relative to one another to the necessary extent, a flange 4 as shown in FIG. 8 may be the end result. The forming (bending) has been performed too quickly, and the compression of the plies at the inside of the bend (such as plies 44a and 44b) has resulted in them undergoing wrinkling or buckling as shown at area 435. Even after the flange wall 4 has been trimmed to height along the cut line 434, some of the unwanted distortion 435 will still remain.

It would be desirable to improve the manufacturing method so as to reduce or eliminate this unwanted distortion.

SUMMARY OF THE INVENTION

According to a first aspect of the present invention, there is provided a method of manufacturing a composite structure comprising a main body and a flange which is positioned along a first edge of the main body and which has a wall portion which is connected to the main body through a first bend and a lip portion which is connected to the wall portion through a second bend in the opposite direction to the first bend, the method comprising the steps of: laying-up a preform on a mould, wherein the preform does not have the first and second bends and comprises a first part which corresponds to the main body of the composite structure and a second part which corresponds to the flange of the composite structure, the second part of the preform has a proximal portion which corresponds to the wall portion of the flange and a distal portion which corresponds to the lip portion of the flange, the first and second parts of the preform comprise a plurality of plies and uni-directional ply material extends from the first part of the preform to the distal portion of the second part of the preform; forming the flange by advancing movable portion(s) of the mould to form the proximal portion of the second part of the preform to create the first bend and by forming the distal portion of the second part of the preform around the advancing movable portion(s) of the mould to create the second bend; and curing resin in the formed flange and the first part of the preform.

Because the second part of the preform has the distal portion in addition to the proximal portion, and because the forming operation involves creating the second bend in addition to the first bend, any uni-directional ply material extending from the first part of the preform to the distal portion of the second part of the preform (and located towards the inside of the first bend) will be kept in tension along its length. This will prevent distortion (wrinkling or buckling) of that ply material at the inside of the first bend.

Any uni-directional ply material located towards the inside of the second bend will also be kept in tension along its length during the forming operation, and this will prevent any distortion of that ply material at the inside of the second bend.

Effectively, the second bend balances the first bend because it bends in the opposite direction to the first bend.

In a preferred embodiment, the flange comprises tape which is at an oblique angle and/or is perpendicular relative to the first edge of the main body.

Preferably the first and second parts of the preform each include tape laid at an oblique angle relative to the first edge of the main body. The oblique angle (the included angle relative to the first edge of the main body) may be 10° to 80°. Alternatively, the range could be 20° to 70°, or 30° to 60°. In a particularly preferred embodiment, all of the oblique-angle tapes are laid at an included angle relative to the first edge (wherein the first edge corresponds to the boundary between the first and second parts of the preform) of substantially 60°.

Preferably, each of the plies comprises the uni-directional ply material. This helps to maximise the benefit of the present invention.

Preferably, the uni-directional ply material is pre-impregnated uni-directional tape containing any suitable resin such as epoxy resin.

In a preferred embodiment, each ply is made of such tape. The plies may be woven, non-woven or a combination of woven plies and non-woven plies.

As an alternative to the uni-directional ply material being pre-impregnated uni-directional tape, the plies which are laid-up to produce the preform could be "dry" reinforcement (such as fiber tow) and the resin is added later on. The resin could be added before, during or after the flange forming step, for example by using the resin transfer moulding (RTM) technique.

In a preferred embodiment, the mould comprises a first mould portion, the movable mould portion(s) adjacent the first mould portion, and a second mould portion adjacent the movable mould portion(s); and in the laying-up step, the first part of the preform is laid-up on the first mould portion, the proximal portion of the second part of the preform is laid-up on the movable mould portion(s), and the distal portion of the second part of the preform is laid-up on the second mould portion.

The second mould portion may have a free edge which is used to define the free edge of the laid-up distal portion of the second part of the preform. Thus, the plies may be laid-up past the free edge of the second mould portion and then trimmed back to the free edge.

In a preferred embodiment, the second mould portion may be selected from a set of second mould portions having different sizes or dimensions in the direction corresponding to the unformed height of the lip portion. For example, if the second mould portion is annular, the set of second mould portions may have different thicknesses.

In a preferred embodiment, the mould portions provide an annular (usually, a generally-cylindrical) mould surface. For example, the mould surface is circular.

With an annular configuration of the mould surface provided by the mould portions, the movable mould portion(s) will move radially outwards during the forming step. Preferably, the plies of the second part of the preform do not include any circumferential tape because such tape would impede the forming operation by resisting the increase in diameter of the second part of the preform as it is radially outwardly formed.

The movable mould portions may be blocks which are spaced apart along the first edge and can be moved from a retracted configuration to a radially outwardly-advanced configuration. If the desired flange is not annular and is, for example, a straight flange, the block or blocks can advance in generally the same direction. For example, a single block, such as an elongate bar, could be used during the forming operation of a generally straight flange.

In a preferred embodiment, the preform is covered with a vacuum bag membrane and during the forming step a vacuum is applied to the preform. An elastic membrane may be chosen that is flexible as well as stretchable.

In a preferred embodiment, the vacuum bag membrane presses or holds the distal portion of the second part of the preform against the mould surface(s) of the movable portion(s) of the mould as the movable portion(s) advance and create the second bend.

The holding or clamping force provided by the vacuum bag membrane is provided by atmospheric pressure acting on the membrane and thus on the preform.

In a preferred embodiment, a force applied to the distal portion of the second part of the preform during the forming operation initially presses the distal portion against the second mould portion. The distal portion slides onto the movable mould portion(s) as the movable mould portion(s) advance, and the distal portion is pressed against the movable mould portion(s) during the rest of the forming operation, as the second bend is created.

In a preferred embodiment, the method further comprises the step of positioning a forming tool to hold the first part of the preform against the mould; and in the forming step, the advancing movable portion(s) of the mould form the proximal portion of the second part of the preform around the forming tool to create the first bend.

In an alternative embodiment, a forming tool may not be needed if the first part of the preform has sufficient strength to remain substantially unaffected by the forming of the flange. For example, the first part of the preform could be annular and incorporate circumferential reinforcement adjacent to the flange, such as circumferential or 0° tapes. This reinforcement enables the first part of the preform to resist being increased in diameter by the forming operation.

In a preferred embodiment, the preform is heated to a first temperature and the forming step is performed; and the curing step is performed at a second temperature higher than the first temperature.

The heating to the first temperature helps the plies at the first and second bends to slip over one another during the flexing of the forming step.

The subsequent heating to the second, higher temperature is then used to perform or complete the curing step. The heating to the first temperature may conveniently be the first part of the curing operation.

The first temperature may, for example, be between 40° and 100° C., or between 50° and 90° C., or between 60° and 80° C. In our current embodiment, we use 80° C.

The second temperature made be 120° C. or higher. In our current embodiment, we use a temperature of about 135° C.

In a preferred embodiment, the plies of the first and second parts of the preform include tape laid at an oblique angle to the boundary between the first and second preform parts.

For example, the tape laid at an oblique angle may be laid at an included angle relative to the boundary between the first and second preform parts of 10° to 80°. As an alternative to this range, the range may be 20° to 70°, or 30° to 60°. In a particularly preferred embodiment, all of the oblique angle tapes are laid at an included angle of substantially 60°.

In a preferred embodiment, the oblique-angle tape extends to the free edge of the distal portion of the second part of the preform from the first part of the preform.

In a preferred embodiment, the plies of the first and second parts of the preform include tape laid at a perpendicular angle to the boundary between the first and second preform parts.

For example, the perpendicular tape may extend to the free edge of the distal portion of the second part of the preform from the first part of the preform.

In one embodiment, the plies at the boundary between the first and second preform parts may be stacked having a regularly-repeating pattern of plies. An example of such a pattern is a ply with perpendicular-angle tape, a ply with oblique-angle tape at plus $\theta°$ (such as plus 60°) and a ply with oblique-angle tape at minus $\theta°$ (such as minus 60°). This pattern then repeats to provide the required depth of plies in the preform, or at least a substantial part (e.g. the central part) of the required depth of plies. Different patterns might be used at the upper and lower surfaces of the preform.

In a preferred embodiment, the first part of the preform has a central zone and an edge zone which is adjacent the boundary between the first and second preform parts; the central zone of the first part of the preform does not include perpendicular-angle tape; and the edge zone of the first part of the preform includes perpendicular-angle tape.

Both the central zone and the edge zone may include tape laid generally parallel to the boundary between the first and second preform parts.

The generally-parallel tape may also be included in the second preform part, for example if the flange is a generally-straight flange. If the flange is annular (such as when the flange is part of a containment case) then usually the second preform part will not include any generally-parallel tape because it would impede the forming of the annular flange because the tape would not stretch when forming a flange which projects radially outwards from the annular housing of the containment case.

In a preferred embodiment, the method further comprises the step of, after the curing step, trimming off the lip portion of the flange.

The lip portion may sometimes not be needed during the eventual use of the composite structure. After the forming of the lip portion has served the purpose, during the manufacturing process, of tensioning the uni-directional ply material in the wall portion and at the first bend (to prevent distortion such as wrinkling) the lip portion may be removed.

However, the lip portion will often be retained because it improves the stiffness or rigidity of the flange and thus of the composite structure.

According to a second aspect of the present invention, there is provided a composite structure manufactured according to the method of the first aspect of the present invention.

According to a third aspect of the present invention, there is provided a method of manufacturing a containment case for a gas turbine engine, wherein the containment case comprises an annular housing and an annular flange which is positioned at an end of the housing and which has an annular wall portion which is connected to the housing through a first bend and an annular lip portion which is connected to the wall portion through a second bend in the opposite direction to the first bend, the method comprising the steps of: laying-up an annular preform on a mould, wherein the preform does not have the first and second bends and comprises a first part which corresponds to the housing of the containment case and a second part which corresponds to the flange of the containment case, the second part of the preform has a proximal portion which corresponds to the wall portion of the flange and a distal portion which corresponds to the lip portion of the flange, the first and second parts of the preform comprise a plurality of plies and uni-directional ply material extends from the first part of the preform to the distal portion of the second part of the preform; forming the flange by radially outwardly-moving movable portion(s) of the mould to form the proximal portion of the second part of the preform to create the first bend and by forming the distal portion of the second part of the preform around the outwardly-moving movable portion(s) of the mould to create the second bend; and curing resin in the formed flange and the first part of the preform.

According a fourth aspect of the present invention, there is provided a containment case for a gas turbine engine, manufactured according to the method of the third aspect of the present invention.

In relation to the third and fourth aspects of the present invention, the preferred features discussed above in relation to the first and second aspects of the present invention are also applicable, mutatis mutandis.

BRIEF DESCRIPTION OF THE DRAWINGS

Embodiments of the present invention will now be described, by way of example only, with reference to the accompanying drawings in which.

Figure 1:
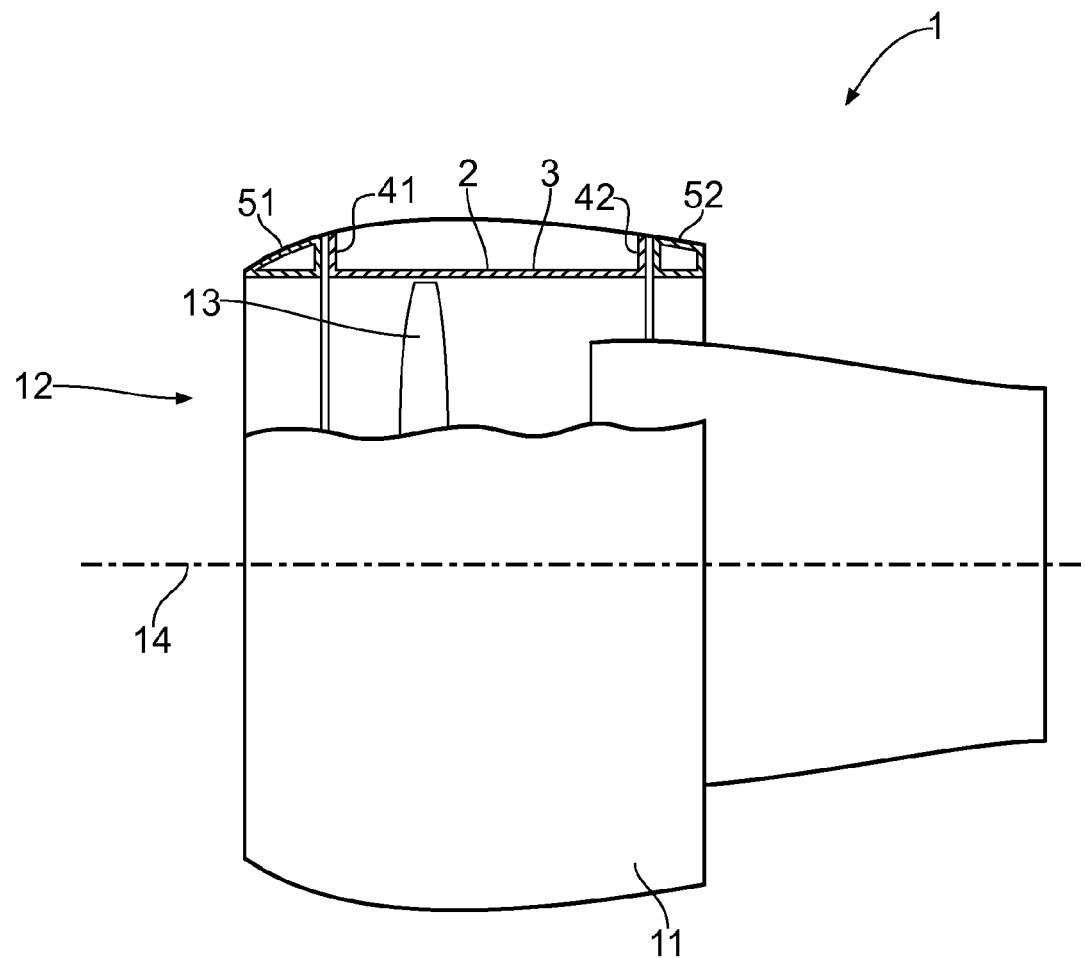
FIG. 1 is a diagrammatic side view of a turbofan engine, partly cut away to show a containment case and a fan blade.
Figure 2:
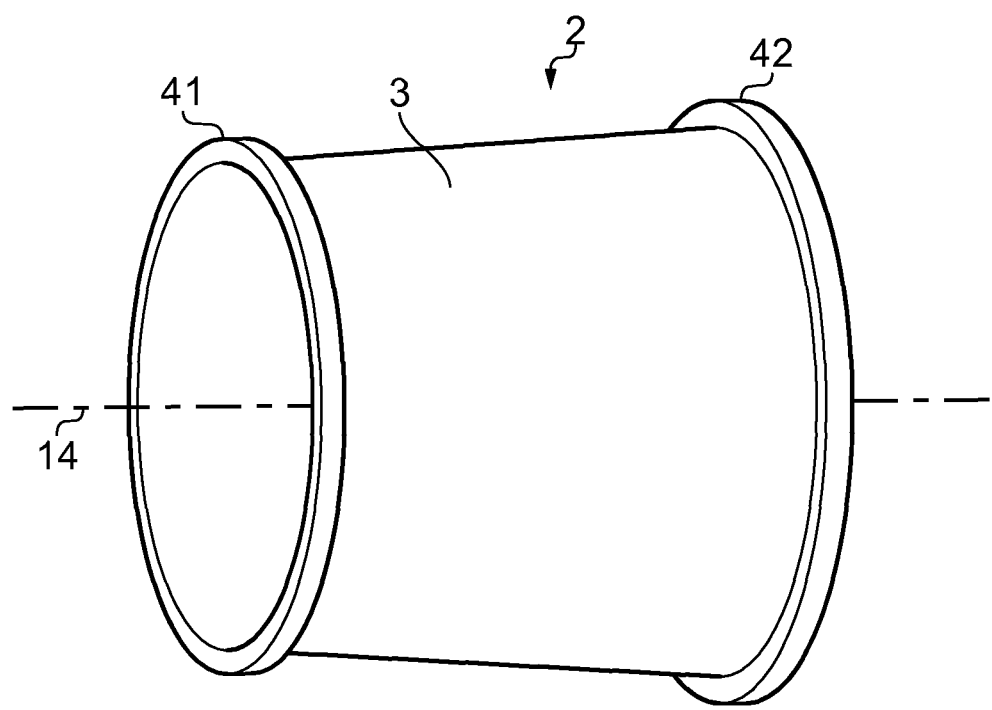
FIG. 2 is a diagrammatic perspective view of a containment case generally similar to the containment case shown in FIG. 1.
Figure 3:
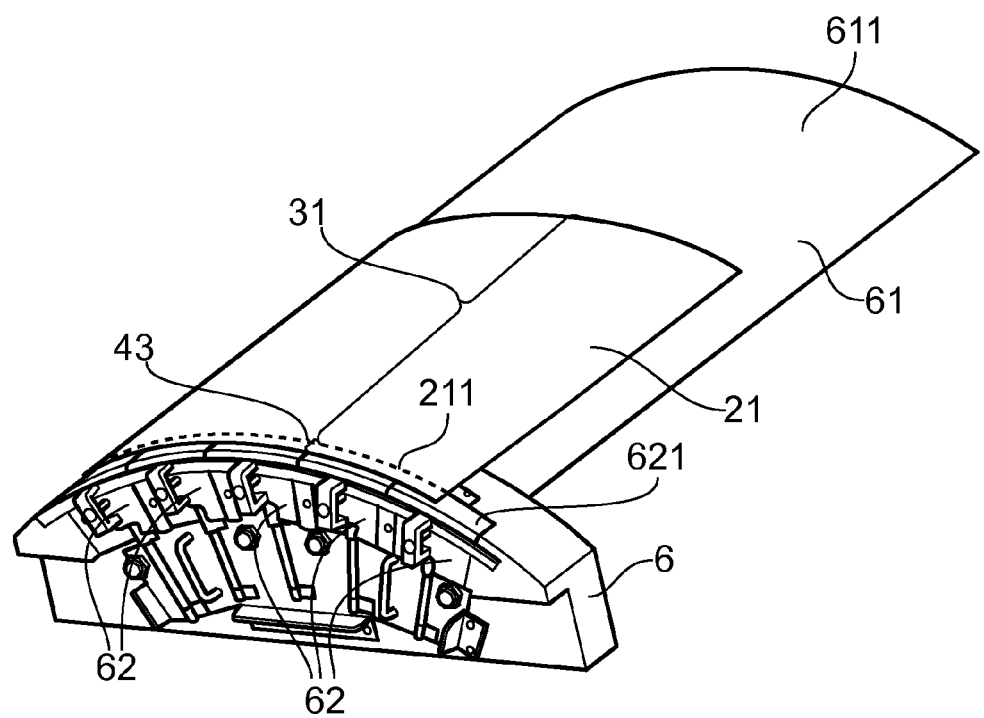
FIGS. 3 and 4 are perspective views showing two stages in the use of an experimental tool for forming a flange.
Figure 4:
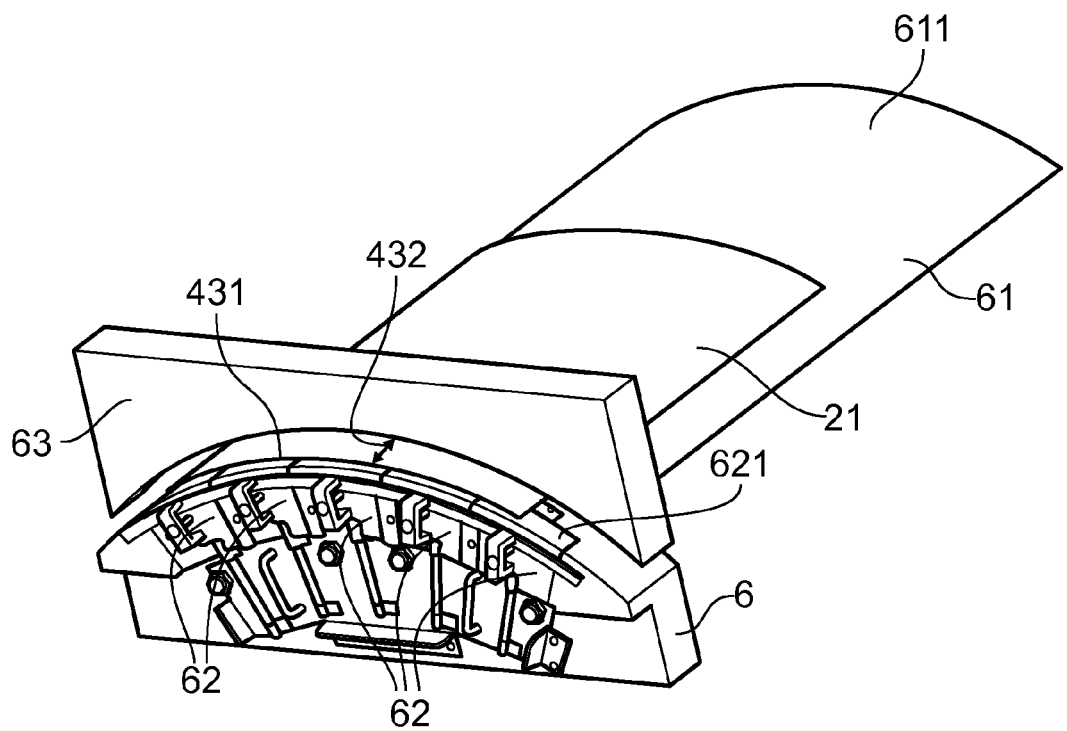
Figure 5:
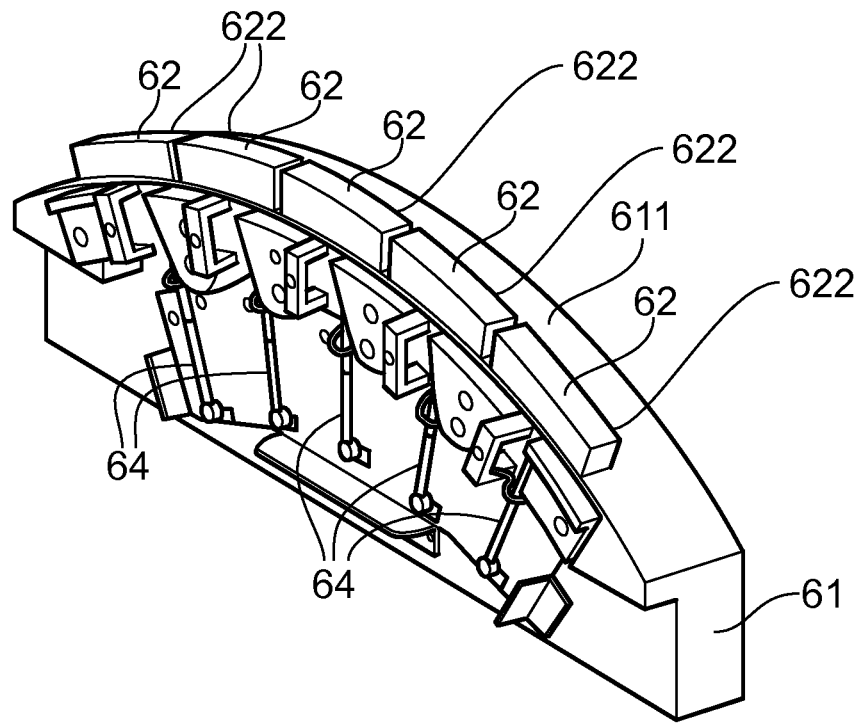
FIGS. 5 and 6 are perspective and end views respectively of the movable blocks of the experimental tool which are used to form the flange.
Figure 6:
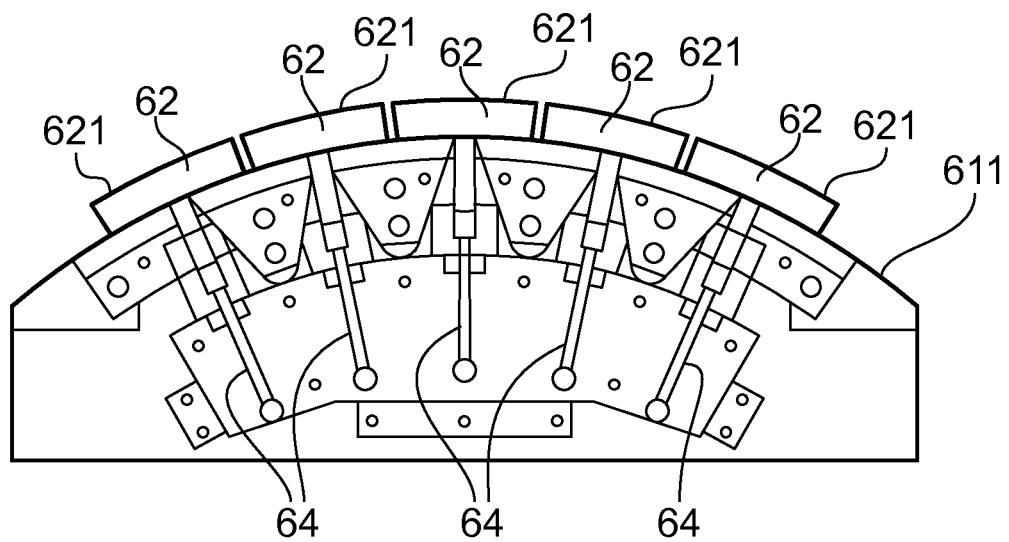
Figure 7:
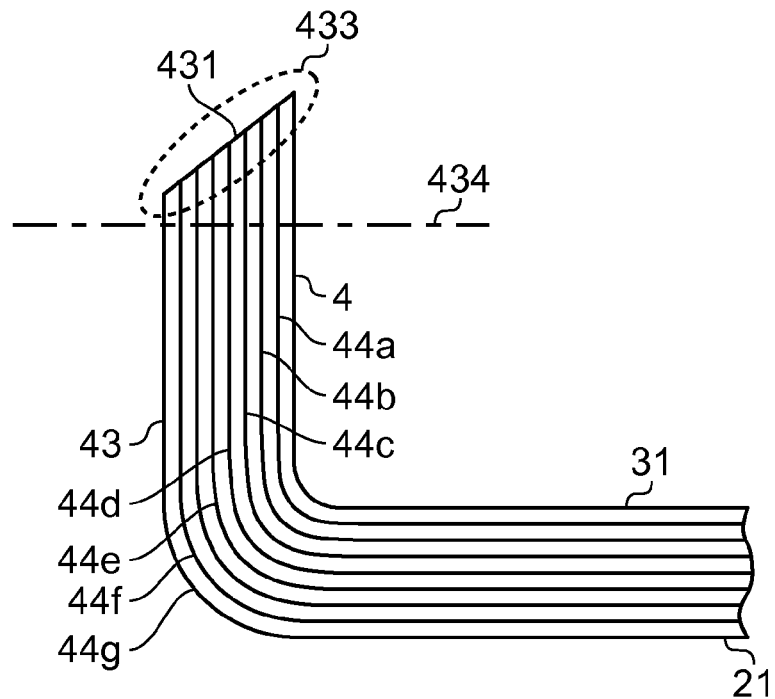
FIGS. 7 and 8 are diagrammatic cross-sectional views through the flange wall formed using the experimental tool of FIGS. 3 to 6, with FIG. 7 showing the outcome of a correct forming operation and FIG. 8 showing the outcome of an incorrect forming operation.
Figure 8:
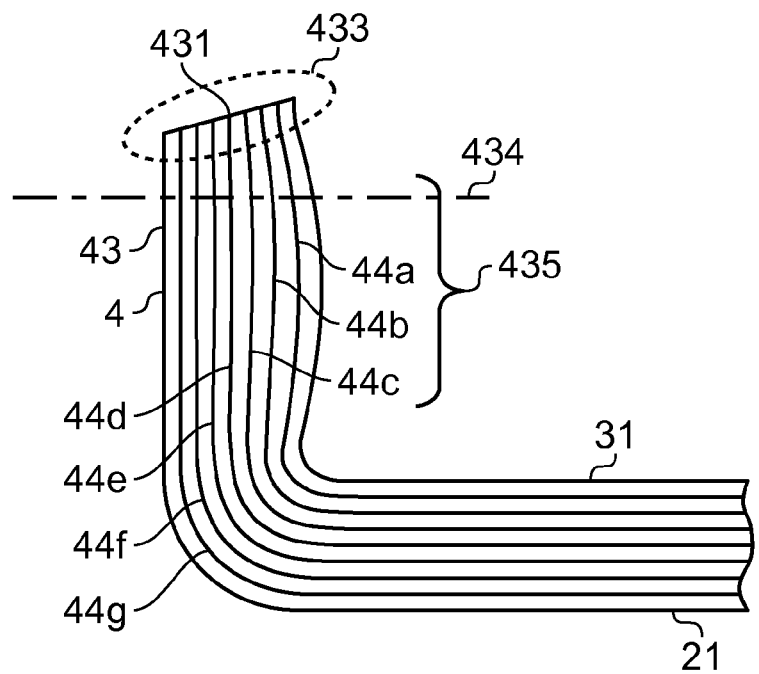

While the invention is susceptible to various modifications and alternative forms, specific embodiments are shown by way of example in the drawings and are herein described in detail. It should be understood, however, that the drawings and detailed description of the specific embodiments are not intended to limit the invention to the particular forms disclosed. On the contrary, the invention covers all modifications, equivalents and alternatives falling within the spirit and the scope of the present invention as defined by the appended claims.

DESCRIPTION OF EMBODIMENTS

Embodiments of the present invention will be described with reference to FIGS. 9 to 14 which illustrate how the method of the present invention builds on our existing method already described above with reference to FIGS. 3 to 8.

Figure 9:
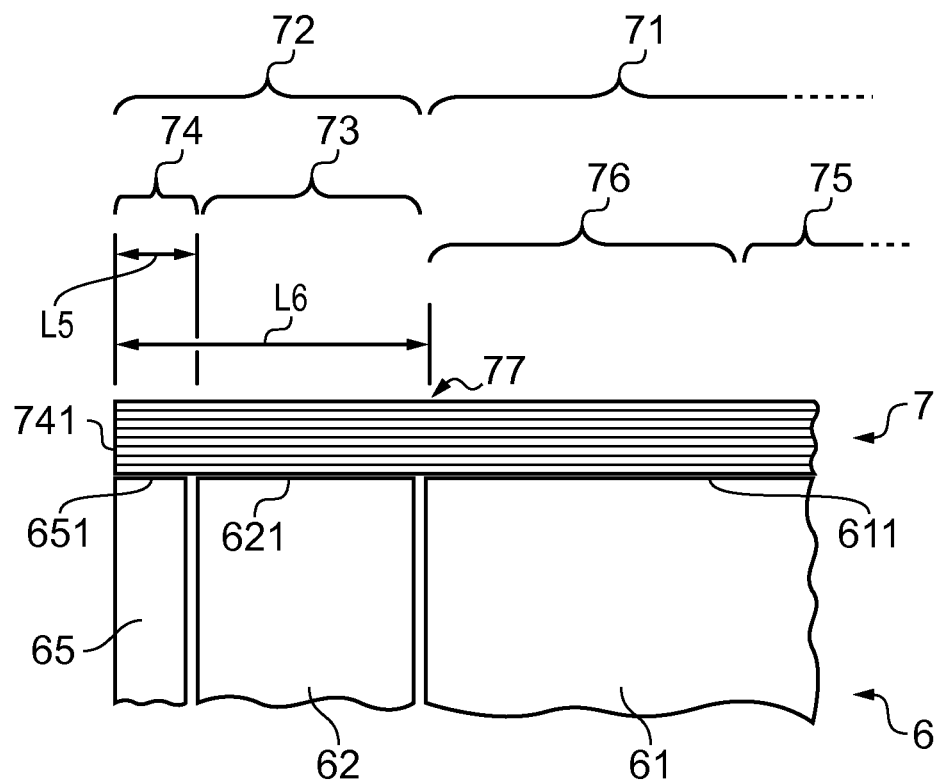
FIGS. 9 to 13 illustrate the stages of a manufacturing process in accordance with the present invention, focussing on the formation of the first and the second bends.

As shown in FIG. 9, the mould 6 of the experimental tool of FIGS. 3 to 6 is modified by the addition of a second mould portion in the form of an end plate 65 which is positioned adjacent the movable blocks 62 (the movable mould portions). The main or first part 61 of the mould (the first mould portion) is fixed to the end plate 65 (the second mould portion) so that both the first and second mould portions 61, 65 are fixed or static relative to the movable blocks 62. The mould surface 651 of the end plate 65 combines with the mould surface 611 of the first part 61 and the mould surfaces 621 of the movable blocks 62 to form an overall mould surface which is a curved part of a generally-cylindrical mould surface, and a preform 7 is laid-up on the mould surfaces 611, 621, 651 by the head of an ATL machine (see FIG. 9).

The composite material that is laid-up to form the preform 7 is the same pre-impregnated uni-directional tape that is described above in relation to laying-up the experimental part 21, such as carbon fibre tape containing epoxy resin.

The preform is laid-up with a first part 71 on the mould surface 611 and a second part 72 on the mould surfaces 621, 651. The second part 72 is split into a proximal portion 73 which is laid-up on the surface 621 of the movable blocks 62 and a distal portion 74 which is laid-up on the surface 651 of the end plate 65.

The first part 71 of the preform 7 corresponds to the first part 31 of the experimental part 21. The proximal portion 73 of the preform 7 corresponds to the second part 43 of the experimental part 21. The preform 7 is longer than the experimental part 21 (in the leftward direction in FIG. 9) because the preform includes the distal portion 74 and the mould 6 includes the end plate 65.

Oblique-angle tape is laid-up in both the first and second parts 71, 72 and at least some of these tapes extend from the first part 71 to the free edge 741 of the distal portion 74. In many embodiments, each oblique-angle tape extends the full length of the preform 7 from the end of the preform opposite to the free edge 741 (i.e. from the right-hand end of the preform as viewed in FIG. 9) through to the free edge 741 (i.e. to the left-hand end of the preform as viewed in FIG. 9).

The first part 71 has a central zone 75 and an edge zone 76 which is adjacent the boundary 77 between the first part 71 and the second part 72. Perpendicular-angle tape (90° tape) is laid-up to extend from the edge zone 76 to the free edge 741 of the distal portion 74. The central zone 75 does not include any perpendicular-angle tape.

Circumferential tape (0° tape) which is generally-parallel to the boundary 77 (i.e. the direction perpendicular to the plane of the paper in FIG. 9) is laid-up in the first part 71 but not in the second part 72.

Seven plies 78a-78g are shown in FIGS. 9 to 14 for reasons of clarity, but in many practical embodiments the number of ply layers will be greater, such as 10 or more, or 20 or more, or 30 or more.

Figure 10:
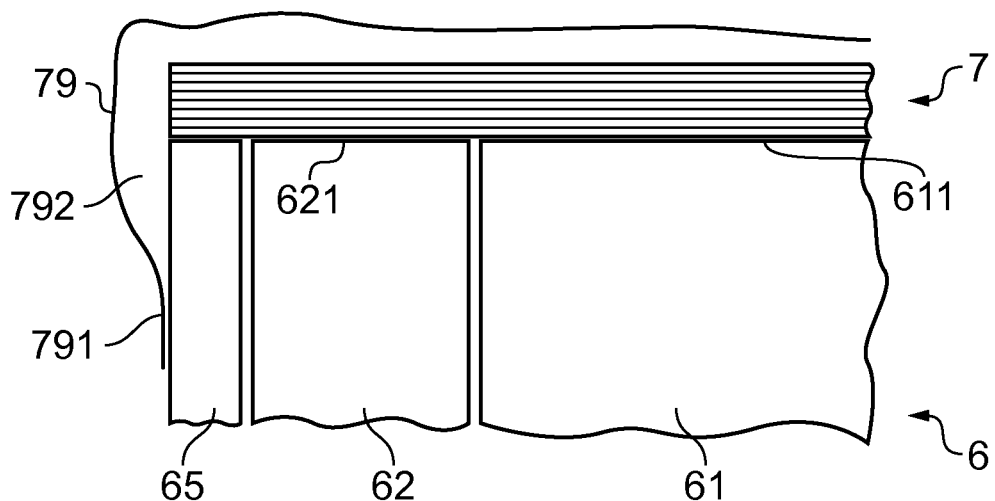

The next stage of the manufacturing process is shown in FIG. 10, wherein a membrane 79 of a vacuum bag is positioned over the preform 7 and sealed around its periphery 791 to the mould 6 so that air can be extracted from the space 792 between the membrane 79 and the preform 7 to enable pressure (atmospheric pressure acting on the membrane 79) to be applied to the preform 7 during the subsequent forming and curing operations.

Figure 11:
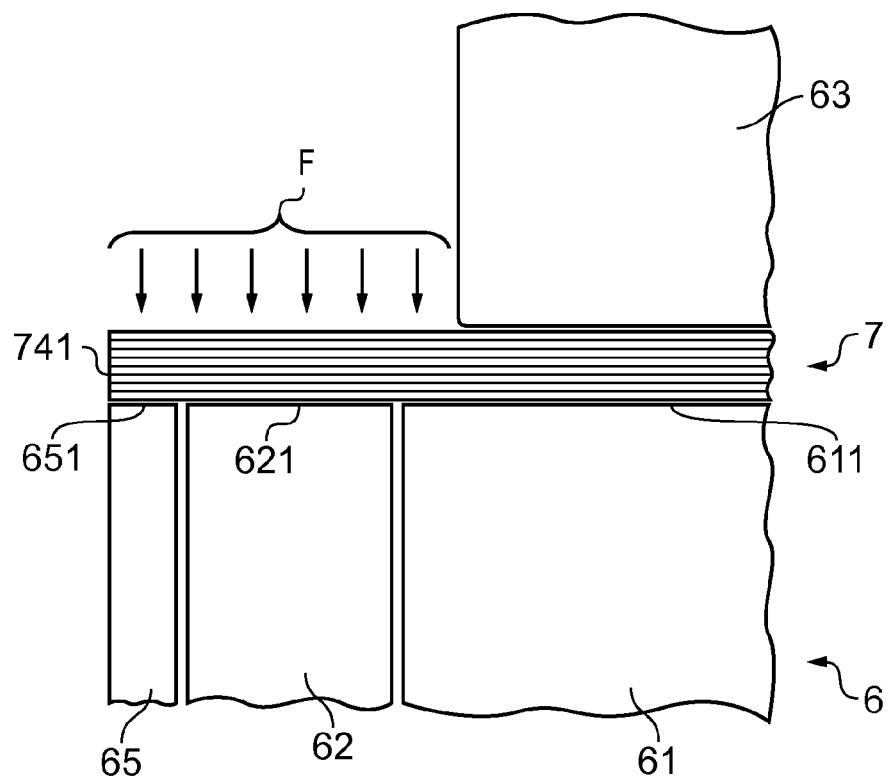
Figure 12:
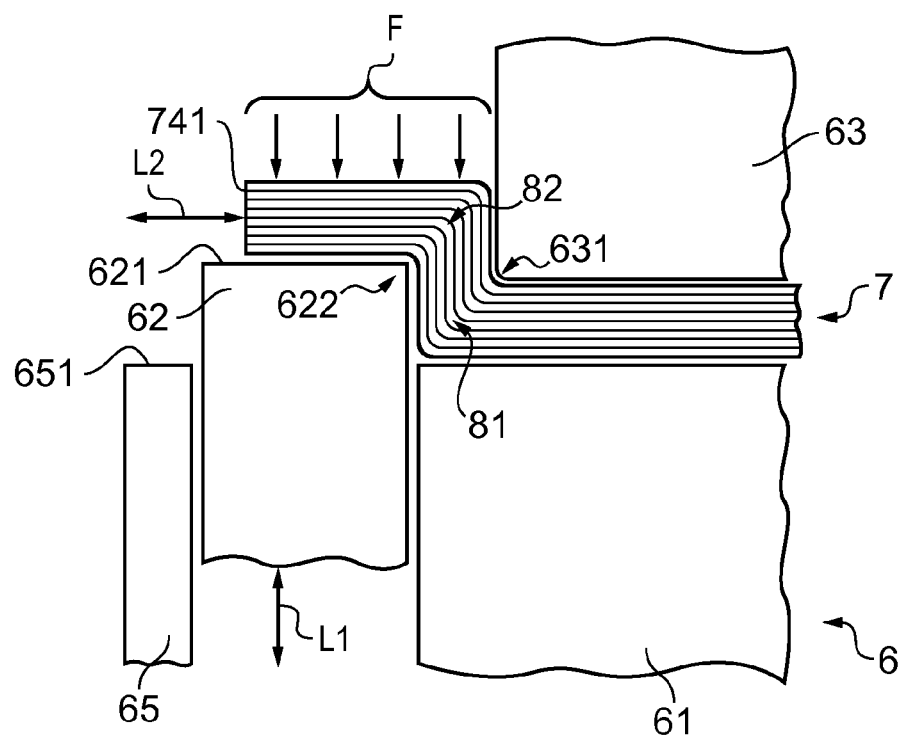
Figure 13:
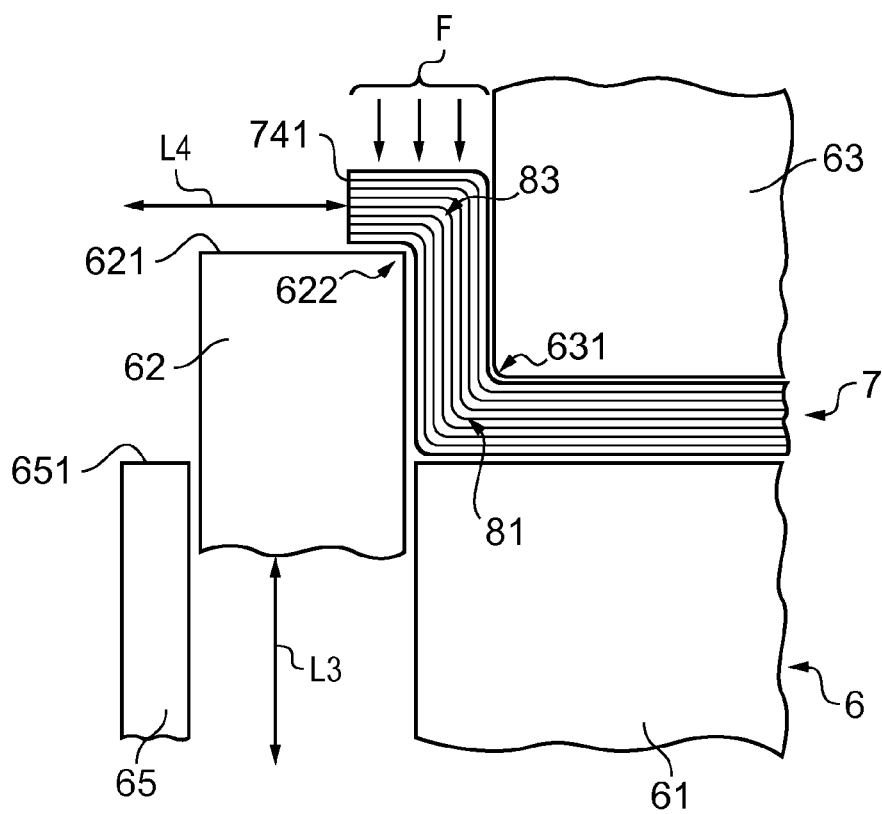

The vacuum bag membrane 79 is not shown in FIGS. 11 to 13 for reasons of clarity. Instead, arrows F are used to depict the clamping or holding force exerted by the membrane 79 on the preform 7 which serves to press the second part 72 against the mould 6 during the forming operation.

After the vacuum has been applied and the membrane 79 has been sucked down onto the preform 7 and the force F has been applied to the preform 7, the next stage of the manufacturing process is as shown in FIG. 11. The female forming tool 63 is moved into position and clamps or holds down the edge zone 76 of the first part 71 of the preform 7. The forming tool 63 is positioned adjacent the boundary 77 but is offset from the boundary by a short distance corresponding to the thickness of the proximal portion 73 of the second part 72 in order to accommodate the movement of the proximal portion 73 during the subsequent forming operation.

The next stage of the manufacturing process is shown in FIG. 12. The temperature is raised to say 80° C. in order to soften the resin in the plies 78 so that they can more easily slide relative to one another. The movable blocks 62 are advanced (raised up or moved radially outwards) a first distance L1 from their retracted positions. The force F presses down on the distal portion 74 as the distal portion 74 is lifted off the mould surface 651 and is pulled sideways (a second distance L2) onto the mould surface 621. As the movable blocks 62 advance, a circumferential edge 622 of the movable blocks 62 pushes against the plies 78 of the preform 7 and forms them around a circumferential edge 631 of the forming tool 63 so as to create a first bend 81 in the preform 7. An interim bend 82 is also created in the preform 7. The distance L2 is approximately the same as the distance L1 because the perpendicular-angle tape prevents the plies 78 from stretching during the forming operation.

The forming operation continues as the movable blocks 62 advance from first distance L1 (FIG. 12) to third distance L3 (FIG. 13). The distal portion 74 is pulled further sideways across the mould surface 621 from second distance L2 (FIG. 12) to fourth distance L4 (FIG. 13). The distal portion 74 continues to be pressed against the mould surface 621 by the force F resulting from the atmospheric pressure acting on the evacuated vacuum bag membrane 79. The circumferential edge 622 of the movable blocks 62 pushes the interim bend 82 to a final position (FIG. 13) defining a second bend 83 of the preform 7. The stroke length (L3) of the movement of the movable blocks 62 is approximately the same as the distance L4.

The forming operation is complete, and the temperature is increased to say 135° C. and the curing operation is performed or completed in order to cure the resin in the composite tape of the plies 78.

The female forming tool 63 is removed, and the vacuum is released from the space 792 inside the membrane 79. The membrane 79 is removed from the mould 6 and the formed and cured preform 7 (now transformed into a composite article 9) is lifted off the mould 6.

Figure 14:
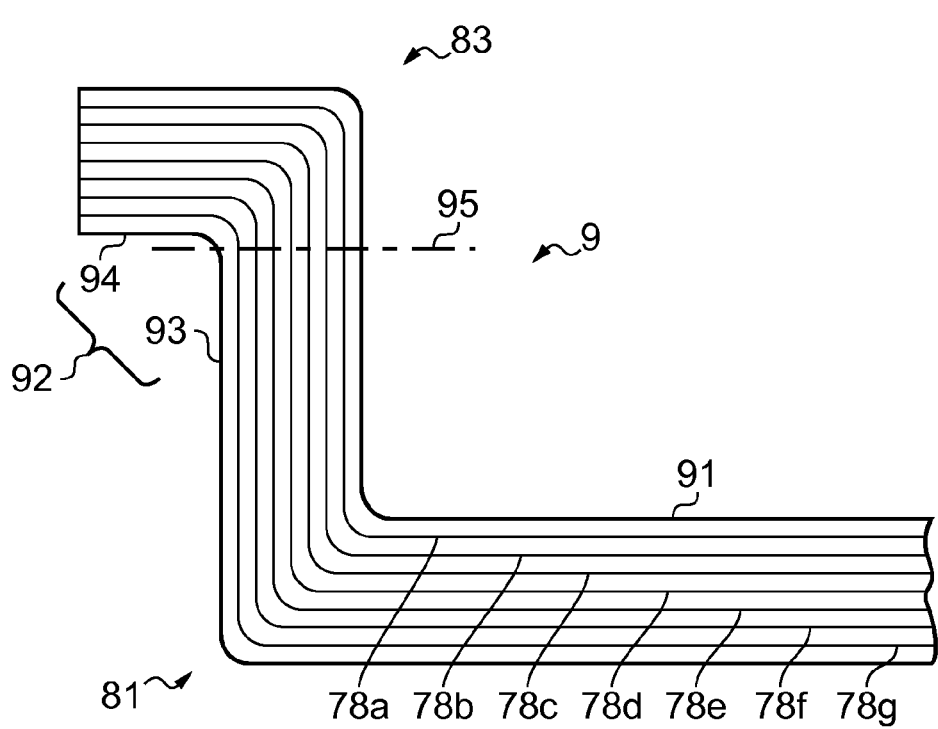
FIG. 14 is an enlarged view of the part of the composite structure shown in FIGS. 9 to 13 after the manufacturing process is complete.

The left-hand end of the composite article 9 is shown in FIG. 14 at an enlarged scale. The article 9 comprises a main body 91 connected via the first bend 81 to a flange 92, and the flange 92 comprises a wall portion 93 which is connected via the second bend 83 to a lip portion 94.

If the teaching of the composite article 9 were to be applied to an annular structure (such as a containment case), the main body 91 would be annular, and the wall portion 93 and the lip portion 94 would also each be annular. The lip portion 94 could be left on the containment case in order to provide additional stiffness to the annular flange 92. This would improve the hoop strength of the containment case. However, if the lip portion is not needed in the finished article, it could be cut off along a cut line 95 which is positioned below and generally parallel to the undersurface of the lip portion 94.

The wall portion 93 is perpendicular to the main body 91 and this maximises the strengthening effect of the wall portion imparted to the main body. The lip portion 94 is perpendicular to the wall portion 93 and this maximises the strengthening effect of the lip portion imparted to the wall portion. However, if the top surface 621 of the movable blocks 62 is changed to be at an oblique angle to the stroke direction of the movable blocks, the lip portion could be given a different orientation relative to the wall portion.

The radius of curvature of the circumferential edges 631 and 622 may be set so as to impart a desired radius of curvature to the inside of the first bend 81 and the second bend 83 respectively, because the force F ensures that the preform 7 is tightly moulded around the circumferential edges during the forming operation.

During the forming operation, the presence of the interim bend 82 (leading eventually to the creation of the second bend 83) ensures that the plies (such as plies 78a and 78b) near the inside of the first bend 81 are kept in tension along the length of the oblique-angle and perpendicular-angle tapes of those plies, so that wrinkling or buckling of the plies does not occur. The two bends balance one another because they are in opposite directions, and by creating the two bends at the same time during the forming operation the beneficial tensioning effect is achieved.

Similarly, the presence of the first bend 81 ensures that the plies (such as plies 78f and 78g) near the inside of the interim bend 82 (and the second bend 83) are kept in tension during the forming operation to prevent distortion appearing in the wall portion 93.

The stroke length L3 is set to be more than the width L5 (see FIG. 9) of the circumferential strip comprising the distal portion 74 of the preform 7 so that the lip portion 94 is supported on the surface 621 of the movable blocks 62 during the curing operation.

L3 is set to be less than the width L6 (see FIG. 9) of the circumferential strip comprising the second part 72 of the preform 7 so that there is still some material of the distal portion 74 left at the end of the stroke of the movable blocks 62 to form the lip portion 94. It can be visualised that, if for example L3 is significantly bigger than L6, all of the material of the second part 72 of the preform 7 would be converted into wall portion 93 during the forming operation.

The tape is laid-up so that the preform 7 has a substantially uniform ply depth for the second part 72 and at least the edge zone 76 of the first part 71. This helps to ensure smooth bending of the plies during the forming operation.

There has been described a method of manufacturing embodiments of a composite structure 9 comprising a main body 91 and a flange 92 which is positioned along a first edge of the main body 91 and which has a wall portion 93 which is connected to the main body 91 through a first bend 81 and a lip portion 94 which is connected to the wall portion 93 through a second bend 83 in the opposite direction to the first bend 81, the method comprising the steps of: laying-up a preform 7 on a mould 6, wherein the preform 7 does not have the first and second bends 81, 83 and comprises a first part 71 which corresponds to the main body 91 of the composite structure 9 and a second part 72 which corresponds to the flange 92 of the composite structure 9, the second part 72 of the preform 7 has a proximal portion 73 which corresponds to the wall portion 93 of the flange 92 and a distal portion 74 which corresponds to the lip portion 94 of the flange 92, the first and second parts 71, 72 of the preform 7 comprise a plurality of plies 78 and uni-directional ply material 78 extends from the first part 71 of the preform 7 to the distal portion 74 of the second part 72 of the preform 7; forming the flange 92 by advancing movable portion(s) 62 of the mould 6 to form the proximal portion 73 of the second part 72 of the preform 7 to create the first bend 81 and by forming the distal portion 74 of the second part 72 of the preform 7 around the advancing movable portion(s) 62 of the mould 6 to create the second bend 83; and curing resin in the formed flange 92 and the first part 71 of the preform 7.

There has also been described a method of manufacturing a containment case 2 for a gas turbine engine 1, wherein the containment case 2 comprises an annular housing 3 and an annular flange 92 which is positioned at an end of the housing 3 and which has an annular wall portion 93 which is connected to the housing 3 through a first bend 81 and a lip portion 94 which is connected to the wall portion 93 through a second bend 83 in the opposite direction to the first bend 81, the method comprising the steps of: laying-up an annular preform 7 on a mould 6, wherein the preform 7 does not have the first and second bends 81, 83 and comprises a first part 71 which corresponds to the housing 3 of the containment case 2 and a second part 72 which corresponds to the flange 92 of the containment case 2, the second part 72 of the preform 7 has a proximal portion 73 which corresponds to the wall portion 93 of the flange 92 and a distal portion 74 which corresponds to the lip portion 94 of the flange 92, the first and second parts 71, 72 of the preform 7 comprise a plurality of plies 78 and uni-directional ply material 78 extends from the first part 71 of the preform 7 to the distal portion 74 of the second part 72 of the preform 7; forming the flange 92 by radially outwardly-moving movable portion(s) 62 of the mould 6 to form the proximal portion 73 of the second part 72 of the preform 7 to create the first bend 81 and by forming the distal portion 74 of the second part 72 of the preform 7 around the outwardly-moving movable portion(s) 62 of the mould 6 to create the second bend 83; and curing resin in the formed flange 92 and the first part 71 of the preform 7.

The invention claimed is:

1. A method of manufacturing a composite structure comprising a main body and a flange which is positioned along a first edge of the main body and which has a wall portion which is connected to the main body through a first bend and a lip portion which is connected to the wall portion through a second bend in the opposite direction to the first bend, the method comprising the steps of:
   laying-up a curved preform on a mould, wherein the preform does not have the first and second bends and comprises a first part which corresponds to the main body of the composite structure and a second part which corresponds to the flange of the composite structure, the second part of the preform has a proximal portion which corresponds to the wall portion of the flange and a distal portion which corresponds to the lip portion of the flange, the first and second parts of the preform comprise a plurality of plies and uni-directional ply material extends from the first part of the preform to the distal portion of the second part of the preform;
   forming the flange by advancing movable portions of the mould to form the proximal portion of the second part of the preform to create the first bend and by forming the distal portion of the second part of the preform around the advancing movable portions of the mould to create the second bend; and
   curing resin in the formed flange and the first part of the preform;
   wherein the movable mould portions are blocks which are spaced apart along the first edge and which, in the forming step, are moved from a retracted configuration to a radially outwardly-advanced configuration with respect to the curved preform.

2. A method according to claim 1, wherein the uni-directional ply material is pre-impregnated uni-directional tape.

3. A method according to claim 1, wherein:
   the mould comprises a first mould portion, the movable mould portions adjacent the first mould portion, and a second mould portion adjacent the movable mould portions; and in the laying-up step, the first part of the preform is laid-up on the first mould portion, the proximal portion of the second part of the preform is laid-up on the movable mould portions, and the distal portion of the second part of the preform is laid-up on the second mould portion.

4. A method according to claim 1, wherein the preform is covered with a vacuum bag membrane and during the forming step a vacuum is applied to the preform.

5. A method according to claim 1, wherein:
the method further comprises the step of positioning a forming tool to hold the first part of the preform against the mould; and
in the forming step, the advancing movable portions of the mould form the proximal portion of the second part of the preform around the forming tool to create the first bend.

6. A method according to claim 1, wherein:
the preform is heated to a first temperature and the forming step is performed; and
the curing step is performed at a second temperature higher than the first temperature.

7. A method according to claim 2, wherein the plies of the first and second parts of the preform include tape laid at an oblique angle to the boundary between the first and second preform parts.

8. A method according to claim 2, wherein the plies of the first and second parts of the preform include tape laid at a perpendicular angle to the boundary between the first and second preform parts.

9. A method according to claim 8, wherein:
the first part of the preform has a central zone and an edge zone which is adjacent the boundary between the first and second preform parts;
the central zone of the first part of the preform does not include the perpendicular-angle tape; and
the edge zone of the first part of the preform includes the perpendicular-angle tape.

10. A method according to claim 1, further comprising the step of:
after the curing step, trimming off the lip portion of the flange.

11. A method of manufacturing a containment case for a gas turbine engine, wherein the containment case comprises an annular housing and an annular flange which is positioned at an end of the housing and which has an annular wall portion which is connected to the housing through a first bend and an annular lip portion which is connected to the wall portion through a second bend in the opposite direction to the first bend, the method comprising the steps of:
laying-up an annular preform on a mould, wherein the preform does not have the first and second bends and comprises a first part which corresponds to the housing of the containment case and a second part which corresponds to the flange of the containment case, the second part of the preform has a proximal portion which corresponds to the wall portion of the flange and a distal portion which corresponds to the lip portion of the flange, the first and second parts of the preform comprise a plurality of plies and uni-directional ply material extends from the first part of the preform to the distal portion of the second part of the preform;
forming the flange by radially outwardly-moving movable portions of the mould to form the proximal portion of the second part of the preform to create the first bend and by forming the distal portion of the second part of the preform around the outwardly-moving movable portions of the mould to create the second bend; and
curing resin in the formed flange and the first part of the preform.

* * * * *